United States Patent
Iwata

(10) Patent No.: US 11,693,668 B2
(45) Date of Patent: Jul. 4, 2023

(54) PARALLEL PROCESSING APPARATUS, STORAGE MEDIUM, AND JOB MANAGEMENT METHOD

(71) Applicant: FUJITSU LIMITED, Kawasaki (JP)

(72) Inventor: Akitaka Iwata, Ichinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 306 days.

(21) Appl. No.: 16/857,232

(22) Filed: Apr. 24, 2020

(65) Prior Publication Data
US 2020/0394045 A1   Dec. 17, 2020

(30) Foreign Application Priority Data
Jun. 11, 2019   (JP) ................. 2019-108523

(51) Int. Cl.
G06F 9/48   (2006.01)
G06F 9/50   (2006.01)
G06F 9/38   (2018.01)
G06F 15/80   (2006.01)

(52) U.S. Cl.
CPC .......... *G06F 9/3885* (2013.01); *G06F 9/4881* (2013.01); *G06F 9/5038* (2013.01); *G06F 15/80* (2013.01)

(58) Field of Classification Search
CPC .... G06F 9/3885; G06F 9/4881; G06F 9/5038; G06F 15/80; G06F 9/5027; G06F 9/5072
See application file for complete search history.

(56) References Cited

U.S. PATENT DOCUMENTS

| 2015/0178126 A1* | 6/2015 | Modani ................. G06F 9/4881 718/102 |
| 2015/0277982 A1 | 10/2015 | Iwata |
| 2016/0364267 A1* | 12/2016 | Varadarajan .......... G06F 9/4812 |
| 2017/0116037 A1 | 4/2017 | Li et al. |

FOREIGN PATENT DOCUMENTS

| JP | 2012-173753 A | 9/2012 |
| JP | 2015-185003 A | 10/2015 |
| JP | 2015-194923 A | 11/2015 |

OTHER PUBLICATIONS

Extended European Search Report dated Oct. 9, 2020 for corresponding European Patent Application No. 20170673.6, 9 pages.

* cited by examiner

*Primary Examiner* — Sisley N Kim
(74) *Attorney, Agent, or Firm* — Fujitsu Patent Center

(57) ABSTRACT

A parallel processing apparatus includes a plurality of compute nodes, and a job management device that allocates computational resources of the plurality of compute nodes to jobs, the job management device including circuitry configured to determine a resource search time range based on respective scheduled execution time periods of a plurality of jobs including a job being executed and a job waiting for execution, and search for free computational resources to be allocated to a job waiting for execution that is a processing target among the plurality of jobs, from among computational resources of the plurality of compute nodes within the resource search time range, by backfill scheduling.

15 Claims, 17 Drawing Sheets

FIG. 10

| JOB ID | JOB NAME | NUMBER OF COMPUTE NODES | TIME PERIOD OF USAGE | PRIORITY | JOB STATE |
|---|---|---|---|---|---|
| J100 | jobA | 2 | 7H | - | BEING EXECUTED |
| J101 | jobB | 1 | 9H | - | BEING EXECUTED |
| J102 | jobC | 1 | 4H | - | BEING EXECUTED |
| J103 | jobD | 7 | 5H | P1 | WAITING FOR EXECUTION |
| J104 | jobE | 3 | 6H | P2 | WAITING FOR EXECUTION |
| J105 | jobF | 2 | 11H | P3 | WAITING FOR EXECUTION |
| J106 | jobG | 4 | 4H | P4 | WAITING FOR EXECUTION |
| J107 | jobH | 4 | 2H | P5 | WAITING FOR EXECUTION |
| J108 | jobI | 5 | 3H | P6 | WAITING FOR EXECUTION |
| J109 | jobJ | 3 | 4H | P7 | WAITING FOR EXECUTION |
| J110 | jobK | 1 | 9H | P8 | WAITING FOR EXECUTION |
| J111 | jobL | 1 | 4H | P9 | WAITING FOR EXECUTION |
| J112 | jobM | 3 | 9H | P10 | WAITING FOR EXECUTION |
| J113 | jobN | 3 | 2H | P11 | WAITING FOR EXECUTION |
| J114 | jobO | 1 | 11H | P12 | WAITING FOR EXECUTION |
| J115 | jobP | 1 | 4H | P13 | WAITING FOR EXECUTION |
| J116 | jobQ | 1 | 8H | P14 | WAITING FOR EXECUTION |
| J117 | jobR | 5 | 3H | P15 | WAITING FOR EXECUTION |
| ⋮ | ⋮ | ⋮ | ⋮ | ⋮ | ⋮ |

PARALLEL PROCESSING APPARATUS, STORAGE MEDIUM, AND JOB MANAGEMENT METHOD

CROSS-REFERENCE TO RELATED APPLICATION

This application is based upon and claims the benefit of priority of the prior Japanese Patent Application No. 2019-108523, filed on Jun. 11, 2019, the entire contents of which are incorporated herein by reference.

FIELD

The present invention is related to a parallel processing apparatus, a storage medium, and a job management method.

BACKGROUND

A large-scale parallel computer system, which includes a large number of compute nodes having computational resources, executes a plurality of jobs submitted by users in parallel. Each compute node is a computer including a single central processing unit (CPU) or a plurality of CPUs. Each CPU includes a single core or a plurality of cores.

The job scheduler of a parallel computer system performs job scheduling including allocation of computational resources before each job starts to be executed. The job scheduler selects free computational resources requested by the job from among computational resources of compute nodes to allocate the selected computational resources to the job.

For example, the computational resources of a compute node including a single CPU is sometimes represented using the CPU time. The computational resources of a compute node including a plurality of CPUs are sometimes represented as the number of CPUs×CPU time (or the number of cores×CPU time). The computational resources requested by a job that exclusively uses a plurality of compute nodes in parallel are sometimes represented as the number of compute nodes×time period of (occupied) usage or the like. The computational resources are sometimes simply called resources.

FIG. 1 illustrates an example of job scheduling in a parallel computer system. First, in new job submission (procedure A1), the user submits the job with a specified condition "continuously use a predetermined number of compute nodes only for a predetermined time period" and requests the job scheduler 101 to perform job scheduling. Hereinbelow, the computational resources requested by a job may be described in a format "the number of compute nodes×time period of usage".

In the case where the network topology of compute nodes is Mesh or Torus, when specifying a compute node to be used, the user sometimes specifies a form of Mesh or Torus of the range to be used for a job. For example, for a three-dimensional form, the number of compute nodes of each of sides that respectively represent the length, width, and height is specified.

Next, in job acceptance (procedure A2), the job scheduler 101 accepts the submitted jobs together at regular intervals. In the example in FIG. 1, jobs 16 to 20 are accepted together. Among these jobs, the job 16, the job 18, and the job 20 are the jobs of a user U1, the job 17 is the job of a user U2, and the job 19 is the job of a user U3.

Next, in job selection (procedure A3), the job scheduler 101 sorts all of the jobs waiting for execution including the accepted jobs according to the determined priorities (such as group priorities or user priorities) in order from the highest priority. Thereby, the jobs 16 to 20, a job 6, a job 8, a job 3, a job 5, and a job 10 are rearranged in order of priorities. The job 3, the job 5, and the job 10 are the jobs of the user U1, and the job 6 and the job 8 are the jobs of the user U3.

Next, in computational resource selection (procedure A4), the job scheduler 101 searches for free computational resources requested by each job and allocates the free computational resources to the job. Thereby, allocation of computational resources is performed so that the jobs are started to be executed in order from the highest priority.

For example, the jobs that are being executed at the current time point are the job 1 and the job 2. Computational resources of "2×5" (two compute nodes×five hours) are allocated to the job 1, and computational resources of "1×3" are allocated to the job 2. In contrast, computational resources of "3×3" are allocated to the job 17, which is a job waiting for execution, computational resources of "2×3" are allocated to the job 6, and computational resources of "4×1" are allocated to the job 8. Computational resources of "2×3" are allocated to the job 5 by backfill scheduling.

Backfill scheduling is a scheduling process that allocates computational resources to jobs as processing targets such that gaps between time slots for which computational resources have already been allocated to other jobs are filled in the direction opposite to the forward direction of scheduling in which computational resources are allocated to jobs in order from the highest priority. Processing of filling gaps between the time slots for which computational resources have been allocated is called backfilling. According to backfill scheduling, a job J1 that uses a relatively few compute nodes for a relatively short time may start earlier than a job J2 as long as the job J1 does not hinder the start of execution of the job J2 having a higher priority than the job J1.

Next, in job execution (procedure A5), the job scheduler 101 controls compute nodes so that jobs that use the respective allocated computational resources start in order from a job whose execution start time point has arrived.

FIG. 2 illustrates an example of a computational resource allocation table in the case where the network topology of compute nodes is a one-dimensional torus. The vertical axis represents a compute node and the horizontal axis represents a time point (in units of hours). The total number of compute nodes is eight. The computational resources allocated to each job are represented by a rectangle whose one side is one or more consecutive compute nodes, and the other side is the time period of usage for which these compute nodes are continuously used.

In the drawing, jobA to jobR are the names of jobs (job names), and P1 to P15, which are written in parentheses following the job names, represent priorities of the jobs. The smaller the numeral of a job, the higher the priority. RUN described in parentheses after a job name represents a job being executed.

In the drawing, jobA to jobC are jobs being executed and jobD to jobR are jobs waiting for execution, A rectangle in which the job name of a job is written represents computational resources requested by the job. For example, the computational resources requested by jobE having a priority P2 is "3×6".

When job scheduling is started, first, the job scheduler 101 clears a computational resource allocation table and sets the allocation situations of jobs being executed at the current time point 0.

Two compute nodes are allocated to jobA, and the remaining time period of usage of jobA is 7 hours. Thus, "2×7" is set as the allocation situation of jobA. Similarly, "1×9" is set as the allocation situation of jobB, and "1×4" is set as the allocation situation of jobC.

Next, the job scheduler 101 sorts jobs waiting for execution in order of priorities, and allocates computational resources, without applying backfill scheduling, to the jobs in order from the highest priority.

First, jobD having the highest priority P1 is selected as the processing target. Since the computational resources requested by jobD are "7×5", free computational resources in which seven consecutive compute nodes are free continuously for 5 hours are searched for from the current time point 0 towards the future in the computational resource allocation table. In this case, at a time point 9, which is 9 hours later than the current time point 0, free computational resources of "7×5" are found, and these free computational resources are allocated to jobD.

Next, jobE having the second highest priority P2 is selected as a processing target. Since the priority of jobE is lower than the priority of jobD, it is desirable that computational resources be allocated so that the execution start time point of jobE is later than the execution start time point of jobD. Since the computational resources requested by jobE are "3×6", free computational resources in which three consecutive compute nodes are free continuously for 6 hours are searched for from the time point 9, which is the execution start time point of jobD, towards the future. In this case, at a time point 14, which is 14 hours later than the current time point 0, free computational resources of "3×6" are found, which are allocated to jobE.

Similarly, free computational resources are searched for sequentially for jobs from jobF having a priority P3 to jobR having a priority P15, eventually leading to such computational resource allocation as represented by the computational resource allocation table in FIG. 2.

However, the larger the computational resources requested by each job, the later the time point at which free computational resources that meet the conditions of the request are found. Eventually, a large number of free computational resources are not allocated, as if eaten by worms. Therefore, the number of compute nodes that are used by jobs being executed at the current time point 0 is four, which is only half of the total number of compute nodes. Accordingly, the parallel computer system has an operating ratio of 50%, indicating a decreased operating ratio.

To fill such gaps of free computational resources to improve the operating ratio of a parallel computer system, it is effective to apply backfill scheduling.

FIG. 3 illustrates an example of a computational resource allocation table when backfill scheduling is applied to jobs waiting for execution illustrated in FIG. 2. In this case, computational resources are allocated so that jobH, jobJ, jobK, jobL, jobM, jobN, jobO, jobP, and jobQ start earlier than other jobs with higher priorities.

Setting of the allocation situations of jobs being executed at the current time point 0 and allocation of computational resources to jobD having the highest priority P1 are performed in a similar manner to that illustrated in FIG. 2.

Next, jobE having the second highest priority P2 is selected as a processing target. In backfill scheduling, free computational resources in which three consecutive compute nodes are free continuously for 6 hours are searched for from the current time point 0 towards the future. At this point, because computational resources have been allocated to jobD having a higher priority than jobE, the search for free computational resources from the current time point 0 will not hinder the start of execution of jobD.

However, in the time slots from the current time point 0 to the time point 9, which is the execution start time point of jobD, free computational resources of "3×6" that may be backfilled are not found. Therefore, free computational resources of "3×6" where the time point 14 is the execution start time point are allocated to jobE.

Similarly, for jobF having the priority P3 and jobG having a priority P4, free computational resources are searched for from the current time point 0 toward the future. However, free computational resources that may be backfilled are not found. Free computational resources of "2×11" where the time point 14 is the execution start time point are allocated to jobF, and free computational resources of "4×4" where a time point 25 is the execution start time point are allocated to jobG.

Next, for jobH having a priority P5, free computational resources are searched for from the current time point 0 toward the future. In this case, at the time point 7, free computational resources of "4×2" that may be backfilled are found, and the free computational resources are allocated to jobH.

Subsequently, for jobI to jobR, free computational resources are searched for from the current time point 0 toward the future. If free computational resources that may be backfilled are found, the computational resources are allocated by backfilling. Otherwise, if free computational resources that may be backfilled are not found, computational resources are allocated in a similar manner to that illustrated in FIG. 2, eventually leading to such computational resource allocation as represented by the computational resource allocation table in FIG. 3.

By comparing FIG. 3 with FIG. 2, it is seen that, owing to backfill scheduling, free computational resources requested by each job are found at an earlier time point and free computational resources that are not allocated are decreased.

As illustrated in FIG. 3, for jobL having a priority P9 and jobP having a priority P13, to which computational resources where the current time point 0 is the execution start time point are allocated, execution of the jobs immediately starts. Therefore, the number of compute nodes used by jobs being executed at the current time point 0 is six, and the operating ratio of the parallel computer system is 75%. Accordingly, it is understood that the operating ratio improves due to backfill scheduling.

In regard to backfill scheduling, Japanese Laid-open Patent Publication No. 2015-194923 discloses a parallel computer system in which when free resources are discovered, jobs that may be allocated to free resources are searched for from among unallocated jobs.

In regard to backfill scheduling, Japanese Laid-open Patent Publication No. 2015-185003 discloses a scheduler apparatus in which, for a work flow job, mapping processing is executed based on condition information and column information.

In regard to backfill scheduling, a job scheduling system in Japanese Laid-open Patent Publication No. 2012-173753 is also known. This job scheduling system determines a job that may pass the preceding job but will not delay the job execution start time point of a job that is prohibited from being delayed.

SUMMARY

According to an aspect of the embodiments, a parallel processing apparatus includes a plurality of compute nodes, and a job management device that allocates computational resources of the plurality of compute nodes to jobs, the job management device including circuitry configured to determine a resource search time range based on respective scheduled execution time periods of a plurality of jobs including a job being executed and a job waiting for execution, and search for free computational resources to be allocated to a job waiting for execution that is a processing target among the plurality of jobs, from among computational resources of the plurality of compute nodes within the resource search time range, by backfill scheduling.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating a job information table;

DESCRIPTION OF EMBODIMENTS

In an existing parallel computer system, when backfill scheduling is applied to job scheduling, the job scheduling takes a long time in some cases.

Such a problem occurs not only in a parallel processing apparatus of a parallel computer system or the like having a network topology of a one-dimensional torus but also in a parallel processing apparatus having another network topology.

In one aspect, an object of the present invention is to achieve efficiency in job scheduling to which backfill scheduling is applied, in a parallel processing apparatus.

According to an embodiment, in a parallel processing apparatus, the efficiency of job scheduling to which backfill scheduling is applied may be achieved.

Hereinafter, an embodiment will be described in detail with reference to the drawings.

The format of a computational resource allocation table used in job scheduling varies depending on whether the network topology is Fat Tree, Mesh, Torus, or the like.

For example, for Fat Tree, since each compute node is coupled to all the other compute nodes, the continuity between compute nodes is not important. It is therefore sufficient that a computational resource allocation table is capable of expressing the number of compute nodes that may be used continuously in certain time slots.

In contrast, for Torus, the continuity between compute nodes is important. It is desirable that the form of Torus may express which of a one-dimensional torus, a two-dimensional torus, and a three-dimensional torus is employed. For example, for the three-dimensional torus, it is desirable to be able to express the situation in which compute nodes the number of which is requested by a job continue in the X-axis, Y-axis, or Z-axis direction and these compute nodes are continuously used in certain time slots.

Figure 2:
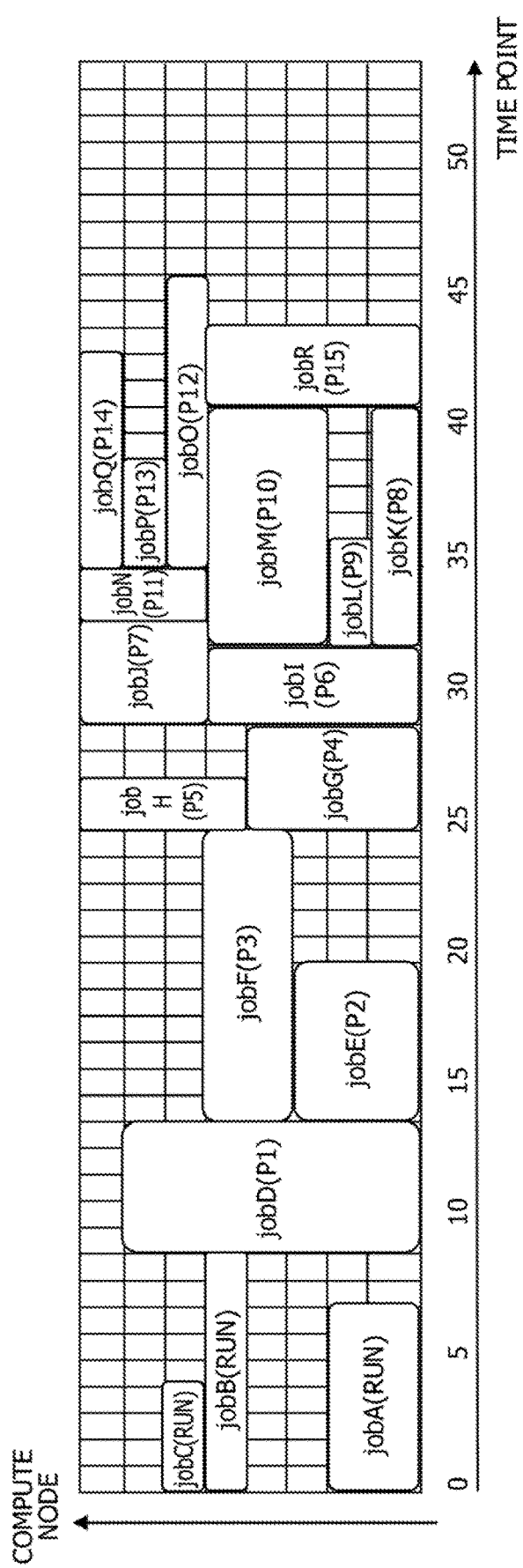
FIG. 2 is a diagram illustrating a computational resource allocation table.

Even in the case where the network topology is the two-dimensional torus, the three-dimensional torus, Mesh, or Fat Tree, a computational resource allocation table may be generated as in the case of the one-dimensional torus illustrated in FIG. 2.

However, as a parallel computer system becomes large-scaled, the network topology becomes complex and the number of submitted jobs becomes significant. As a result, it takes a long time to perform job scheduling. For example, in a large-scale parallel computer system including about 10 thousands compute nodes, when jobs the number of which is between one thousand and one million are submitted, the processing time period of job scheduling ranges from ten minutes to one hour in some cases.

The larger the computational resources requested by each job, the later the time point at which free computational resources that meet the conditions of the request are found. Eventually, it is hard to execute a job on compute nodes in vacant conditions (the conditions in which a job is not being executed). Therefore, the operating ratio of the parallel computer system decreases.

Thus, a method that limits the time range for searching for free computational resources to a predetermined range to suppress an increase in the processing time period of job scheduling is conceived.

Figure 4:
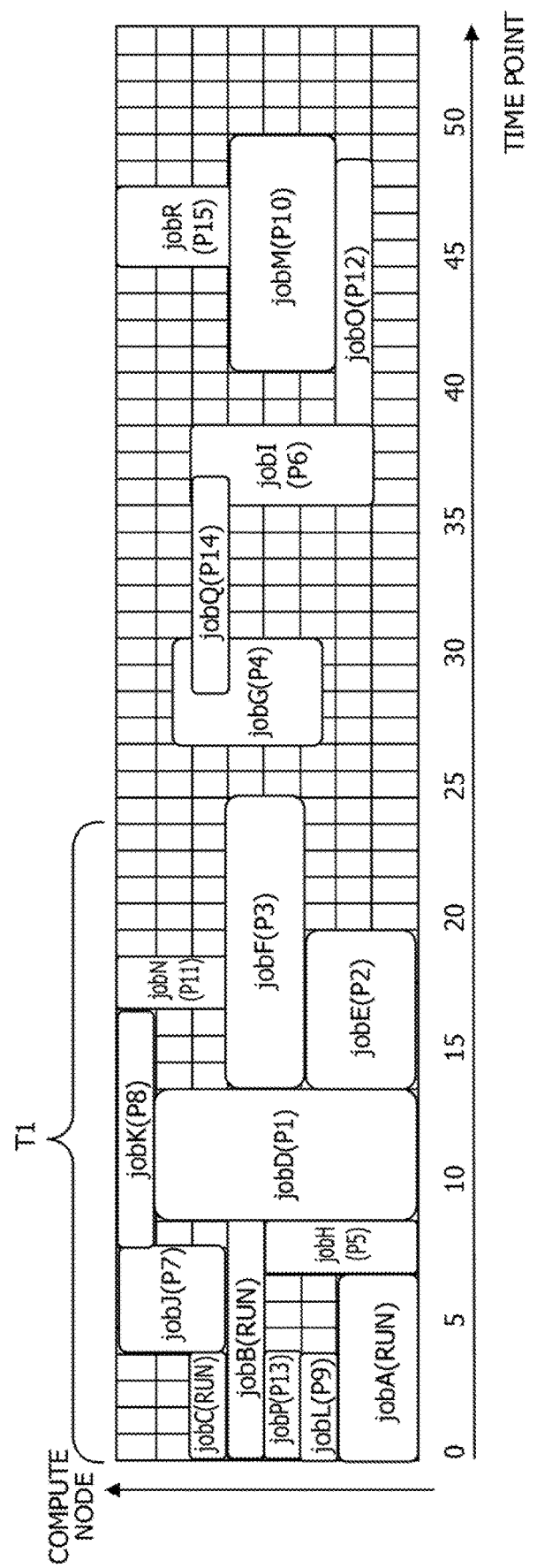
FIG. 4 is a diagram illustrating a computational resource allocation table in which a resource search time range of a fixed value is set.

FIG. 4 illustrates an example of a computational resource allocation table in which a resource search time range of a fixed value is set. In the computational resource allocation table in FIG. 4, a resource search time range T1 from the current time point 0 to a time point 24 is set. Using the resource search time range T1, backfill scheduling is performed for the jobs waiting for execution illustrated in FIG. 2.

Figure 3:
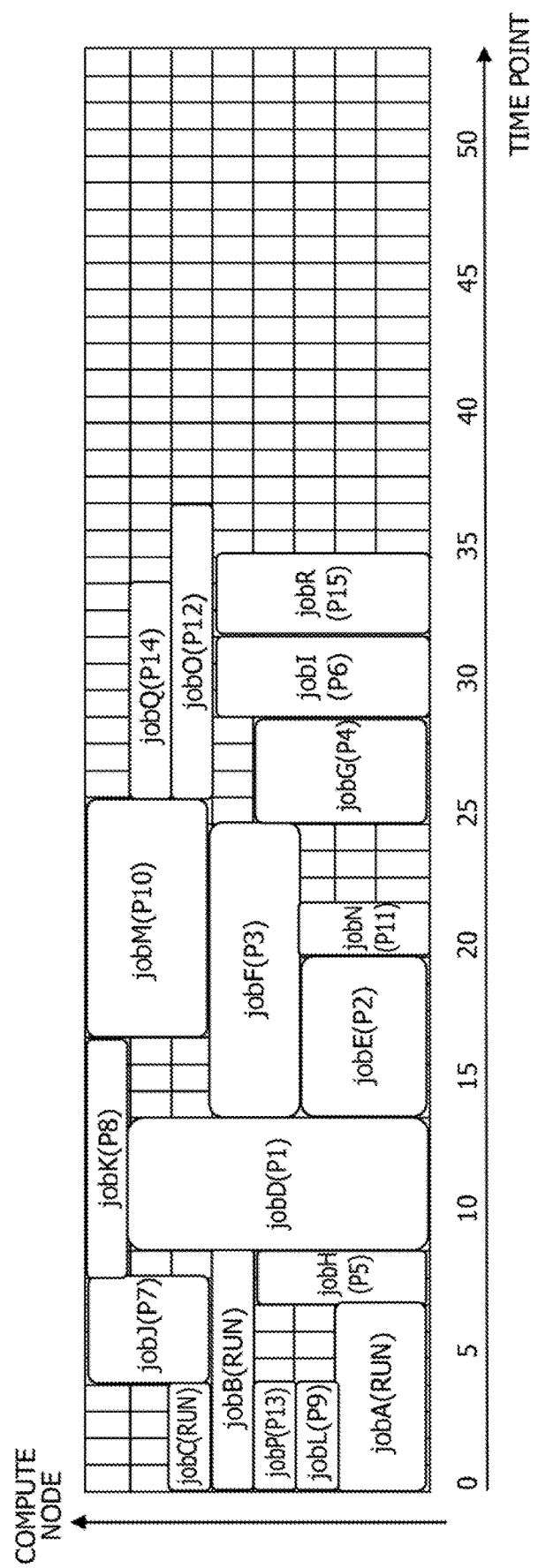
FIG. 3 is a diagram illustrating a computational resource allocation table when backfill scheduling is applied.

Setting of the allocation situations of jobs being executed at the current time point 0 and allocation of computational resources to jobD having the priority P1 and jobE having the priority P2 are performed in a similar manner to that illustrated in FIG. 3.

Next, jobF having the priority P3 is selected as a processing target. In backfill scheduling, free computational resources in which two consecutive compute nodes are free continuously for 11 hours are searched for from the current time point 0 towards the future. At this point, since computational resources have been allocated to jobD and jobE having higher priorities than jobF, the search for free computational resources from the current time point 0 does not hinder the start of execution of these jobs.

However, free computational resources of "2×11" that may be backfilled are not found. Therefore, free computational resources of "2×11" where the time point 14 is the execution start time point are allocated to jobF. In this case, the execution end time point of jobF is a time point 25, which is outside the resource search time range T1. However, this does not result in the occurrence of a job incapable of receiving allocation of computational resources. Thus, such free computational resources are allowed to be allocated.

Next, jobG having the priority P4 is selected as a processing target. Free computational resources in which four consecutive compute nodes are free continuously for 4 hours are searched for from the current time point 0 towards the future. However, the free computational resources of "4×4" are not found within the resource search time range T1. In this case, resource search in a time range after the time point 24 is not performed, and jobG is recorded as a job incapable of receiving allocation of computational resources.

In this way, resource search in a time range exceeding the resource search time range T1 is omitted, so that an unlimited increase in the processing time period is avoided.

Next, for jobs from jobH having the priority P5 to jobL having the priority P9, free computational resources are searched for within the resource search time range T1. If free computational resources are found, the computational resources are allocated. Otherwise, if free computational resources are not found within the resource search time range T1, the processing target job is recorded as a job incapable of receiving allocation of computational resources. Thereby, free computational resources are allocated to jobH, jobJ, jobK, and jobL, whereas jobI is recorded as a job incapable of receiving allocation of computational resources.

Next, jobM having a priority P10 is selected as a processing target. Free computational resources in which three consecutive compute nodes are free continuously for 9 hours are searched for from the current time point 0 towards the future. In this case, although the free computational resources of "3×9" that may be backfilled are not found, free computational resources of "3×9" where a time point 17 is the execution start time point are found.

However, the execution end time point of jobM is a time point 26, which is outside the resource search time range T1 and results in the occurrence of a job incapable of receiving allocation of computational resources.

When a job incapable of receiving allocation of computational resources has occurred, the computational resources in a time range exceeding the resource search time range T1 are computational resources that may be allocated to another job having a higher priority than the processing target job if the resource search time range T1 is not set. Therefore, when a job incapable of receiving allocation of computational resources has occurred, the computational resources in a time range exceeding the resource search time range T1 are not allowed to be allocated to the processing target job. Accordingly, free computational resources are not allowed to be allocated to jobM, and jobM is recorded as a job incapable of receiving allocation of computational resources.

Next, for jobs from jobN having a priority P11 to jobR having the priority P15, free computational resources are searched for within the resource search time range T1. As a result, free computational resources are allocated to jobN and jobP, whereas jobO, jobQ, and jobR are recorded as jobs incapable of receiving allocation of computational resources. Eventually, such computational resource allocation as represented by the computational resource allocation table in FIG. 4 is performed.

In FIG. 4, for ease of description, the resource search time range T1 is set to twenty four hours. However, in usual operations, the resource search time range T1 is often set to a range from about one week to one month.

In such job scheduling, the longer the resource search time range T1, the higher the probability that free computational resources that may be backfilled will be found for the submitted jobs. However, when the resource search time range T1 is too long, the likelihood that the time period for one search process will become too long is increased. Even the search in the large and long resource search time range T1 sometimes ends in a failure such that free computational resources that may be backfilled are not found. In such a case, a long processing time period is eventually wasted.

If a job incapable of receiving allocation of computational resources has occurred, there is an increased likelihood that a job to which free computational resources at a late time point are allocated by backfilling will hinder the start of execution of another job having a higher priority. In this case, if the resource search time range T1 were not set, free computational resources allocated to a job having a low priority could have been allocated to another job having a higher priority than the job.

For example, in the computational resource allocation table in FIG. 3, free computational resources of "3×9" where the time point 17 is the execution start time point are allocated to jobM having the priority P10. In contrast, in the computational resource allocation table in FIG. 4, although free computational resources of "3×2" where the time point 17 is the execution start time point are allocated to jobN having the priority P11, free computational resources are not allocated to jobM. Accordingly, jobN hinders the start of execution of jobM having a higher priority.

To address this, if the resource search time range T1 is shortened, the time period for one search process may be reduced, decreasing the likelihood that a job having a low priority will hinder the start of execution of a job having a high priority.

Figure 5:
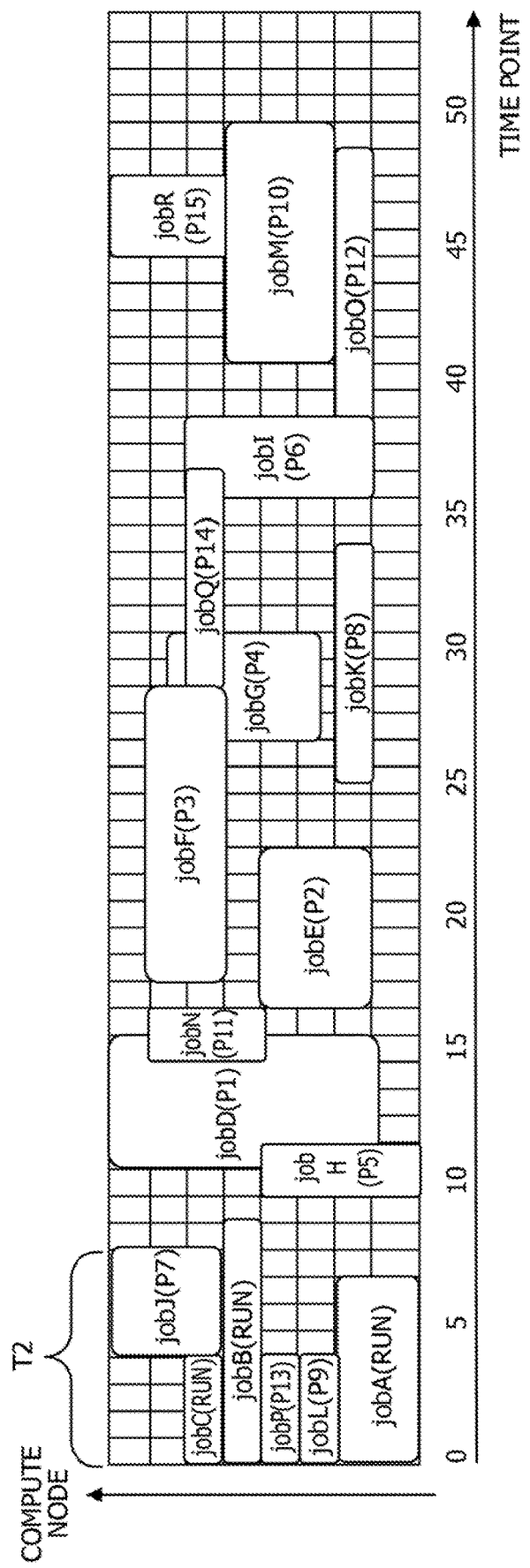
FIG. 5 is a diagram illustrating a computational resource allocation table in which a short resource search time range is set.

FIG. 5 illustrates an example of a computational resource allocation table in which a short resource search time range is set. In the computational resource allocation table in FIG. 5, a resource search time range T2 from the current time point 0 to a time point 8 is set. The resource search time range T2 is 8 hours. In this case, free computational resources are allocated to jobJ, jobL, and jobP, and the other jobs are recorded as jobs incapable of receiving allocation of computational resources.

However, the use of the short resource search time range T2 decreases the probability that free computational resources that may be backfilled will be found for the submitted jobs. For example, although free computational resources that may be backfilled are allocated to jobH, jobK, and jobN in the computational resource allocation table in FIG. 4, free computational resources are not allocated to these jobs in the computational resource allocation table in FIG. 5.

In this way, when the resource search time range is too short, the time taken for one search process is decreased.

However, the probability that free computational resources will not be found is increased. Eventually, the wasted processing time period may be increased.

There is an increased likelihood that free computational resources that may be backfilled will not be found for a job that requests usage for a long time period. For example, the time period of usage requested by jobF in FIG. 5 is 11 hours, which is longer than the resource search time range T2. Free computational resources that may be backfilled are therefore not found within the resource search time range T2.

Furthermore, there is an increased probability that a job waiting for execution having a high priority will be recorded as a job incapable of receiving allocation of computational resources. The situation where the job is not executed at any time (so-called a starvation problem) is more likely to occur. For example, in the computational resource allocation table in FIG. 5, jobD having the highest priority P1 is recorded as a job incapable of receiving allocation of computational resources. A situation where this job is perpetually not executed occurs.

Figure 6:
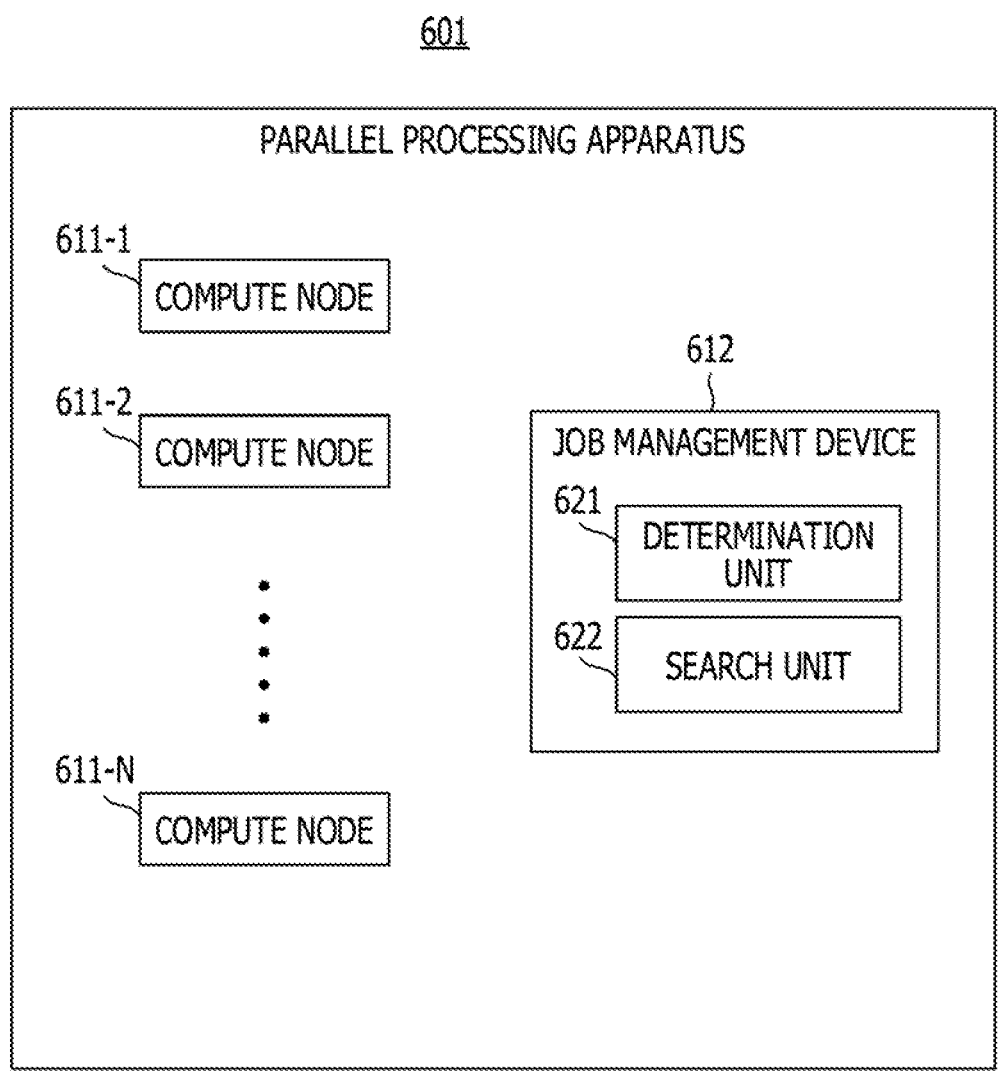
FIG. 6 is a diagram of a functional configuration of a parallel processing apparatus.

FIG. 6 illustrates an example of a functional configuration of a parallel processing apparatus according to the embodiment. A parallel processing apparatus 601 in FIG. 6 includes compute nodes 611-1 to 611-N (N is an integer of two or more) and a job management device 612. The job management device 612, which includes a determination unit 621 and a search unit 622, allocates the computational resources of the compute nodes 611-1 to 611-N to jobs.

Figure 7:
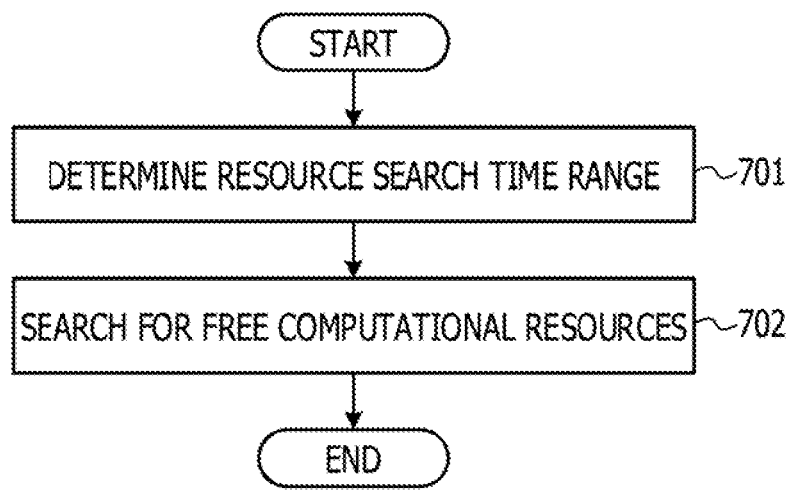
FIG. 7 is a flowchart of a job management process.

FIG. 7 is a flowchart illustrating an example of a job management process performed by the job management device 612 in FIG. 6. First, the determination unit 621 determines a resource search time range based on the respective scheduled execution time periods of a plurality of jobs including a job being executed and a job waiting for execution (step 701).

Next, the search unit 622 searches for free computational resources to be allocated to a job waiting for execution that is the processing target, from among the computational resources of the compute nodes 611-1 to 611-N within the resource search time range, by backfill scheduling (step 702).

According to the parallel processing apparatus 601 in FIG. 6, the efficiency of job scheduling to which backfill scheduling is applied may be achieved in a parallel processing apparatus.

Figure 8:
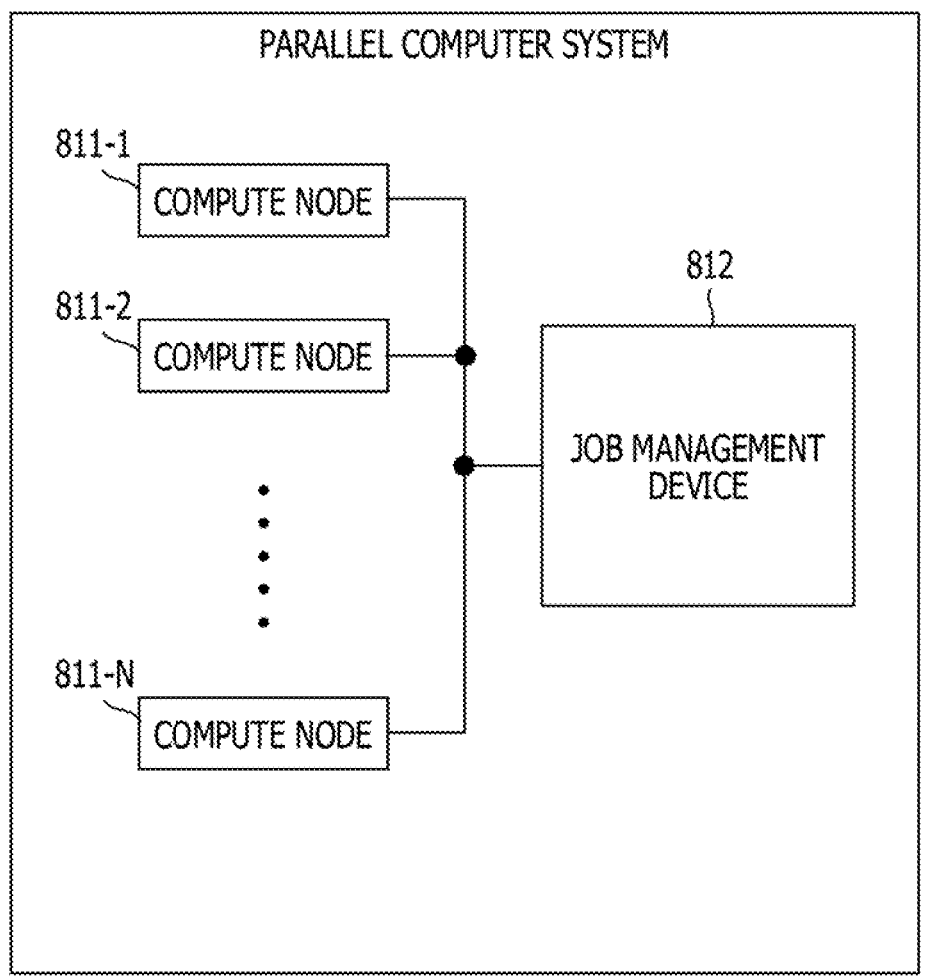
FIG. 8 is a diagram of a configuration of a parallel computer system.

FIG. 8 illustrates an example of a configuration of a parallel computer system 801, which is a specific example of the parallel processing apparatus 601 in FIG. 6. The parallel computer system 801 in FIG. 8 includes compute nodes 811-1 to 811-N and a job management device 812. Each compute node 811-$i$ ($i$=1 to N) is coupled to the job management device 812. The network topology of the compute nodes 811-1 to 811-N may be Fat Tree, Mesh, Torus, or the like.

The compute node 811-$i$ and the job management device 812 correspond to the compute node 611-$i$ and the job management device 612 in FIG. 6, respectively.

Figure 9:
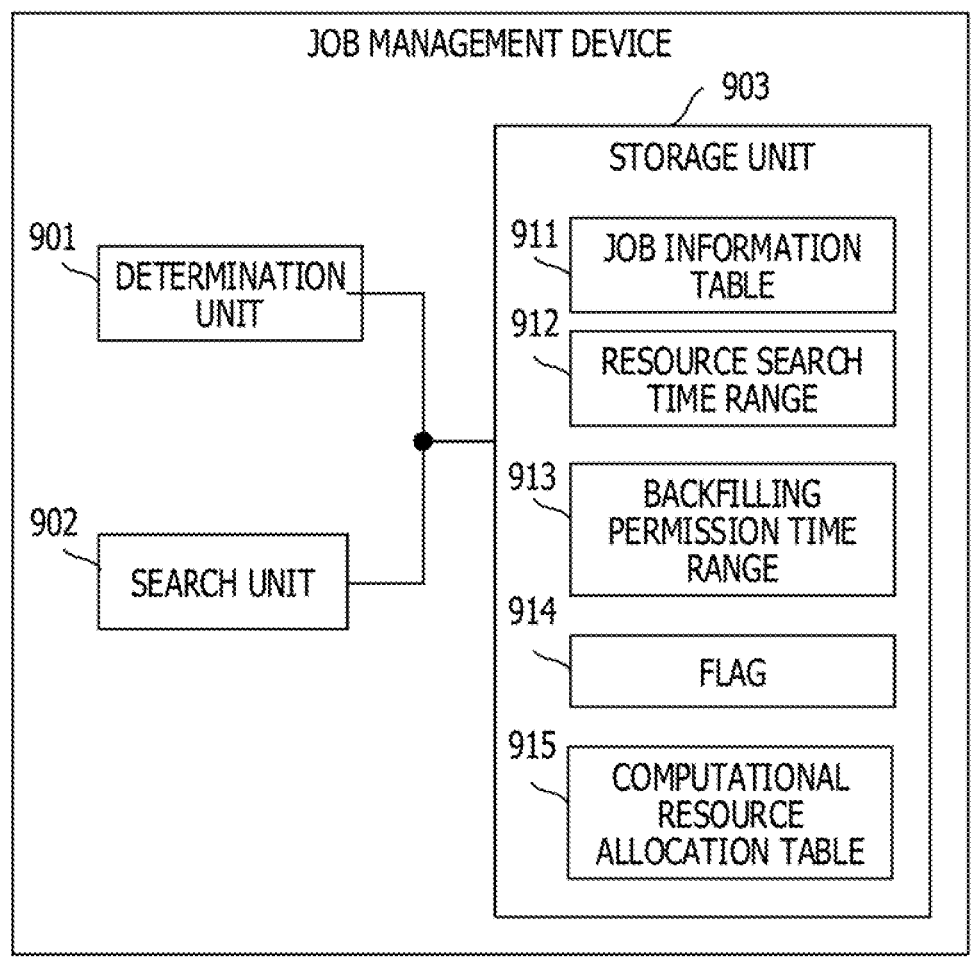
FIG. 9 is a diagram of a functional configuration of a job management device.

FIG. 9 illustrates an example of a functional configuration of the job management device 812 in FIG. 8. The job management device 812 illustrated in FIG. 9 includes a determination unit 901, a search unit 902, and a storage unit 903. The determination unit 901 and the search unit 902, which respectively correspond to the determination unit 621 and the search unit 622 in FIG. 6, operate as a job scheduler. The storage unit 903 stores a job information table 911, a resource search time range 912, a backfilling permission time range 913, a flag 914, and a computational resource allocation table 915.

The job information table 911 holds information of each job. The resource search time range 912 represents a time range for searching for free computational resources and includes sc_start and sc_end as parameters. The parameter sc_start represents the start time point of the resource search time range 912 and the parameter sc_end represents the end time point of the resource search time range 912. The parameters sc_start and sc_end are dynamically changed.

The resource search time range 912 is determined based on the respective scheduled execution time periods of a plurality of jobs including a job being executed and a job waiting for execution submitted to the parallel computer system 801. For example, as the scheduled execution time period of a job, the time period of usage of compute nodes requested by the job is used.

The backfilling permission time range 913 represents a time range in which backfilling may be performed, and includes bf_start and bf_end as parameters. The parameter bf_start represents the start time point of the backfilling permission time range 913 and the parameter bf_end represents the end time point of the backfilling permission time range 913. The parameters bf_start and bf_end are dynamically changed.

The flag 914 has a value of ON or OFF, indicating whether to apply the backfilling permission time range 913. ON indicates that the backfilling permission time range 913 is to be applied, and OFF indicates that the backfilling permission time range 913 is not to be applied. The value of the flag 914 is dynamically switched.

The computational resource allocation table 915 holds the allocation situation of computational resources to each job.

FIG. 10 is a diagram illustrating the job information table 911. The job information table 911 in FIG. 10 includes a job ID, a job name, the number of compute nodes, a time period of usage, a priority, and a job state.

The job ID is identification information of a job, and the job name is the name of a job. The number of compute nodes represents the number of compute nodes requested by a job, and the time period of usage represents the time period of usage of compute nodes requested by the job. The units of the time period of usage are hours (H).

The priority represents the priority of a job, the job state represents whether a job is a job being executed or a job waiting for execution. In the drawing, jobA to jobC are jobs being executed and jobD to jobR are jobs waiting for execution.

For example, jobA, which is a job being executed, requests the computational resources of "2×7", and jobD, which is a job waiting for execution having the priority P1, requests the computational resources of "7×5".

The determination unit 901 and the search unit 902 perform job scheduling to which backfill scheduling is applied, using information stored in the storage unit 903. At the time of start of job scheduling, the determination unit 901 determines the resource search time range 912 and the backfilling permission time range 913 and sets the flag 914 to OFF.

When the flag 914 is OFF, the search unit 902 searches for free computational resources to be allocated to a job waiting for execution that is the processing target, among the computational resources of the compute nodes 811-1 to 811-N, within the resource search time range 912.

If free computational resources are found, the search unit 902 allocates the found free computational resources to the job waiting for execution that is the processing target, and records a result of allocation of the free computational resources in the computational resource allocation table 915.

Otherwise, if free computational resources are not found, the search unit 902 records the job waiting for execution that is the processing target, as a job incapable of receiving allocation of computational resources, in the computational resource allocation table 915 and sets the flag 914 to ON.

When the flag 914 is set to ON, the search unit 902 searches for free computational resources to be allocated to the next job waiting for execution, within the backfill backfilling permission time range 913 instead of the resource search time range 912.

The determination unit 901 determines the resource search time range 912 and the backfilling permission time range 913 so that the time period for one search process is relatively short and the probability that a search process will result in a waste of processing is relatively low. For example, the resource search time range 912 and the backfilling permission time range 913 are determined by determination methods as described below.

(1) Determination Method for Resource Search Time Range 912

The determination unit 901 sets the current time point, which is the start time point of job scheduling, as sc_start. The determination unit 901 determines sc_end by adds, to sc_start, the largest value among the time periods of usage requested by jobs being executed and jobs waiting for execution at the current time point. In this case, a time point that is a certain time period later than the time point obtained by adding, to sc_start, the largest value among the time periods of usage is set as sc_end.

The time point to be set as sc_end may be a time point immediately after the time point obtained by adding together sc_start and the largest value among the time periods of usage, among time points spaced by a unit time period in the computational resource allocation table 915. For example, for the case where the unit time period is 1 hour, when the addition result represents a time point 10.5, a time point 11 is set as sc_end. When the addition result represents the time point 11, a time point 12 is set as sc_end.

According to such a determination method, the resource search time range 912 does not become too long, thus decreasing the likelihood that the time period for one search process will become too long.

The resource search time range 912 does not become too short, thus increasing the probability that free computational resources that may be backfilled will be found. Eventually, there is a decreased likelihood that the wasted processing time period will be increased. The resource search time range 912 does not become too short, thus increasing likelihood that free computational resources that may be backfilled will be found for a job that requests usage for a long time period, such as jobF in FIG. 5.

Since the resource search time range 912 does not become too short, there is a decreased probability that a job waiting for execution having a high priority will be recorded as a job incapable of receiving allocation of computational resources, such as jobD in FIG. 5. This decreases the likelihood that a starvation problem will occur, (2) Determination Method for Backfilling Permission Time Range 913

The determination unit 901 sets, as bf_start, the same time point as sc_start and sets, as bf_end, a time point after the time point at which all of one or more jobs being executed at the current time point will end.

The time point set as bf_end may be, among time points spaced by a unit time period in the computational resource allocation table 915, a time point after the time point at which all the jobs being executed will end. For example, in the case where the unit time period is 1 hour, if all the jobs being executed will end at the time point 9, the time point 9 is set as bf_end, whereas if all the jobs being executed will end at a time point 9.5, a time point 10 is set as bf_end.

A search process is performed using the backfilling permission time range 913, thereby decreasing the probability that free computational resources at a late time point will be allocated by backfilling, even when job incapable of receiving allocation of computational resources has occurred. Accordingly, the likelihood that a job having a low priority will hinder the start of execution of a job having a high priority is decreased.

Even when the resource search time range 912 is long, the search for free computational resources within the backfilling permission time range 913 decreases the likelihood that the time period for one search process will become too long.

In this way, job scheduling is performed using the resource search time range 912 and the backfilling permission time range 913. This may achieve high-speed job scheduling even when a large amount of jobs are submitted in a large-scale parallel computer system. This enables reduction in the time period until the start of a job and improvement in the operating ratio of a parallel computer system.

The backfilling permission time range 913 does not have to be used at any time. Job scheduling may be performed using only the resource search time range 912.

Figure 11:
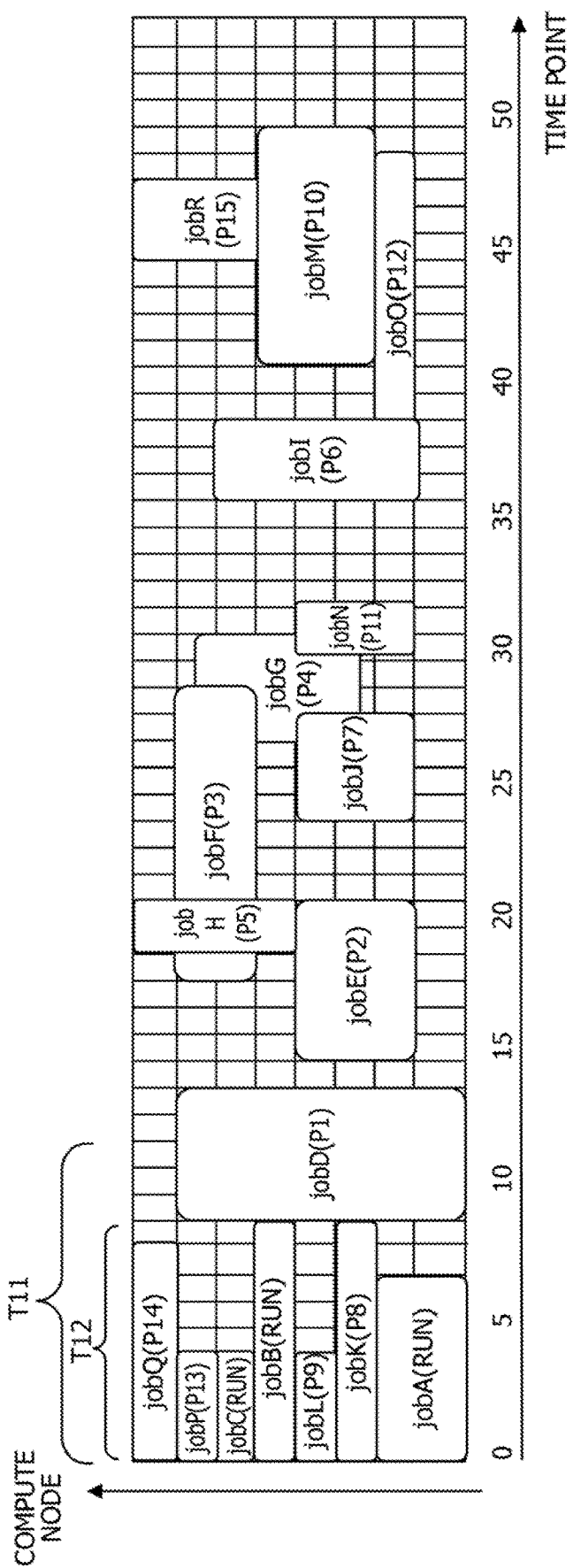
FIG. 11 is a diagram illustrating a computational resource allocation table in which a resource search time range and a backfilling permission time range are set.

FIG. 11 illustrates an example of the computational resource allocation table 915 for the case where the network topology of the compute nodes 811-1 to 811-N is a one-dimensional torus. The vertical axis represents the compute node and the horizontal axis represents the time point (in units of hours). The total number of compute nodes is eight.

In the computational resource allocation table 915 in FIG. 11, jobA to jobR illustrated in FIG. 10 are recorded, Among these jobs, jobA to jobC are jobs being executed. The execution start times of jobA to jobC are the current time point 0. A resource search time range T11 corresponds to the resource search time range 912, and a backfilling permission time range T12 corresponds to the backfilling permission time range 913.

Figure 12:
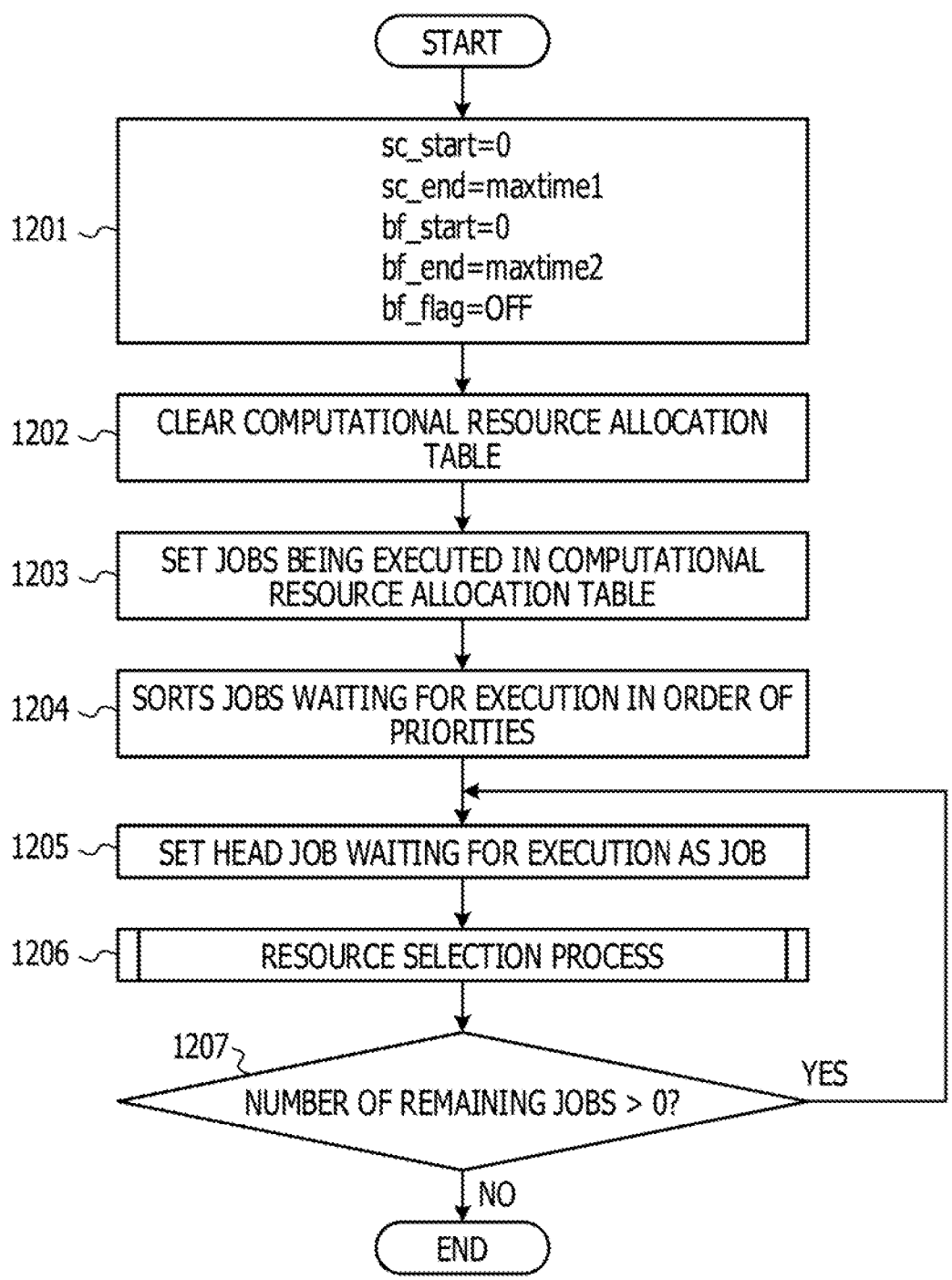
FIG. 12 is a flowchart of job scheduling.

FIG. 12 is a flowchart illustrating an example of job scheduling performed by the job management device 812. First, the determination unit 901 determines the resource search time range 912 and the backfilling permission time range 913 and sets the flag 914 to OFF (step 1201).

At this point, the determination unit 901 sets sc_start and bf_start to the current time point 0, sets sc_end to maxtime1, and sets bf_end to maxtime2. The determination unit 901 sets bf_flag, which corresponds to the flag 914, to OFF.

Here, maxtime1 is, among time points spaced by a unit time period in the computational resource allocation table 915, a time point immediately after a time point obtained by adding, to the current time point 0, the largest value among the time periods of usage requested by jobs. Here, maxtime2 is, among the time points spaced by a unit time period in the computational resource allocation table 915, a time point after the time point obtained by adding, to the current time point 0, the largest value among the remaining time periods of usage of jobs being executed.

As the remaining time period of usage of a job being executed, the time period of usage remaining after the execution time period that has already elapsed at the current time point 0 is subtracted from the time period of usage of compute nodes requested by the job is used. Accordingly, the time point obtained by adding, to the current time point 0, the largest value among the remaining time periods of usage of jobs being executed represents a time point at which all the jobs being executed will end.

For example, in the job information table 911 in FIG. 10, the largest value among the time periods of usage requested by jobA to jobR is 11 hours, which is the time period of usage of each of jobF and jobO. The time point 12, which is 1 hour later than the time point 11 obtained by adding 11 hours to the current time point 0, is set as sc_end. Accordingly, the resource search time range T11 is a time range from the current time point 0 to the time point 12, and has a length of 12 hours.

The remaining time periods of usage of jobA to jobC, which are jobs being executed, match the time periods of usage requested by these jobs. The largest value among these remaining time periods of usage is 9 hours, which is the remaining time period of usage of jobB. The time point 9 obtained by adding 9 hours to the current time point 0 is set as bf_end. Accordingly, the backfilling permission time range T12 is a time range from the current time point 0 to the time point 9. Its length is 9 hours.

Next, the search unit 902 clears the computational resource allocation table 915 (step 1202) and sets the allocation situations of jobs being executed in the computational resource allocation table 915 (step 1203).

Thereby, as illustrated in FIG. 11, the computational resources of "2×7" requested by jobA, the computational resources of "1×9" requested by jobB, and the computational resources of "1×4" requested by jobC are recorded in the computational resource allocation table 915.

Next, the search unit 902 sorts the jobs waiting for execution in order of priorities (step 1204), extracts the head job waiting for execution, which has the highest priority, from a result of sorting, and sets the extracted job as JOB (step 1205).

Next, the search unit 902 performs a resource selection process for the job waiting for execution indicated by JOB as the processing target (step 1206) and checks the number of remaining jobs waiting for execution that have not been extracted from the result of sorting (step 1207).

If the number of remaining jobs is not zero (step 1207, YES) the search unit 902 repeats the step 1205 and the subsequent steps. However, if the number of remaining jobs is zero (step 1207, NO), the process ends.

Figure 13:
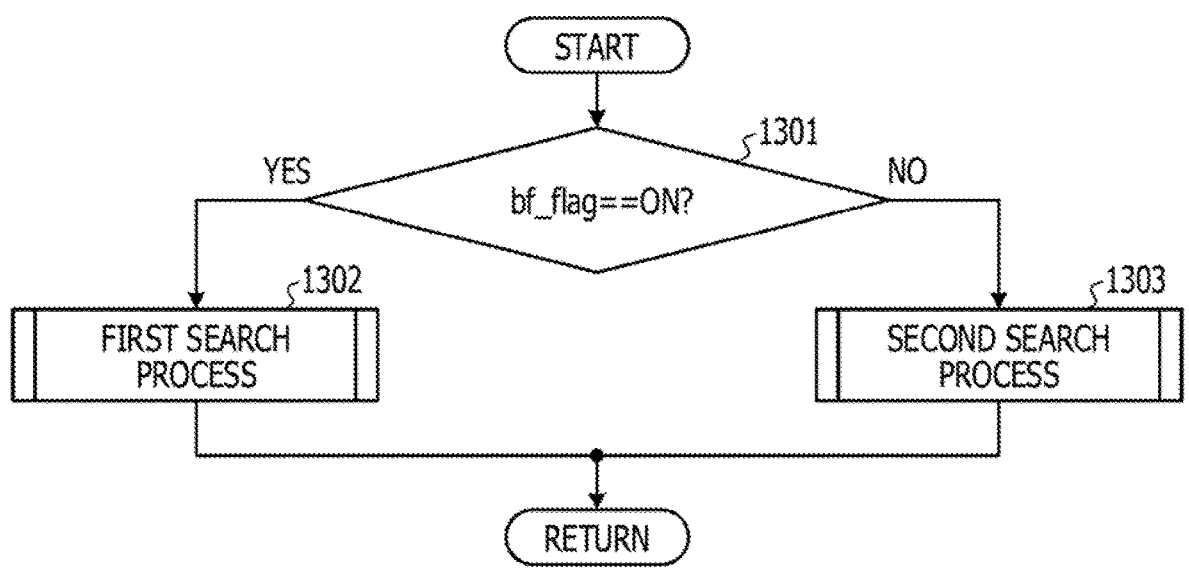
FIG. 13 is a flowchart of a resource selection process.

FIG. 13 is a flowchart illustrating an example of the resource selection process in step 1206 in FIG. 12. First, the search unit 902 checks the value of bf_flag (step 1301). If bf_flag is ON (step 1301, YES), the search unit 902 performs a first search process (step 1302); however, if bf_flag is OFF (step 1301, NO), the search unit 902 performs a second search process (step 1303). After that, the search unit 902 performs step 1207 and the subsequent steps in FIG. 12.

Figure 14:
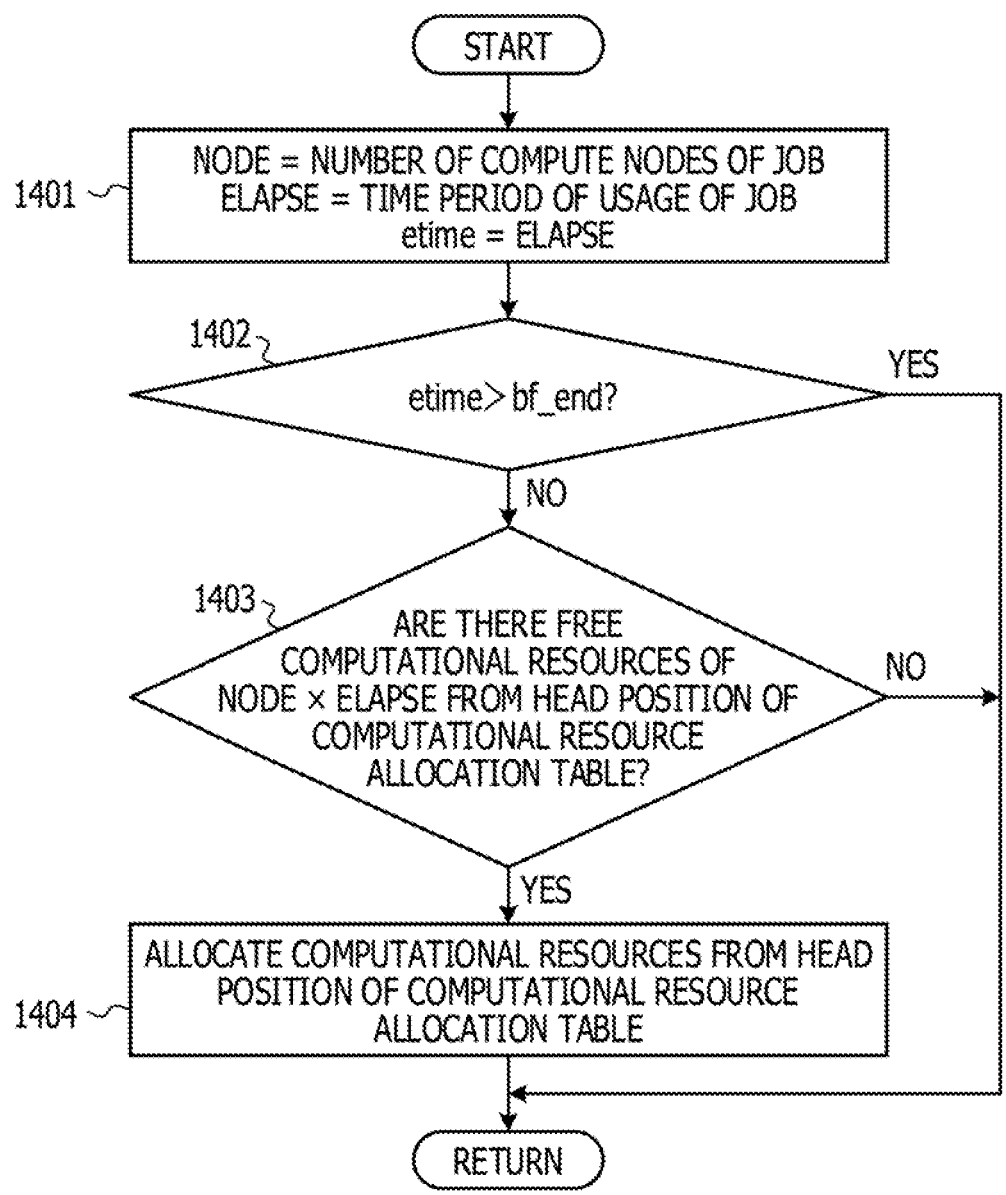
FIG. 14 is a flowchart of a first search process.

FIG. 14 is a flowchart illustrating an example of the first search process in step 1302 in FIG. 13. In the first search process, within the backfilling permission time range T12, free computational resources requested by a job waiting for execution indicated by JOB are searched for.

First, the search unit 902 sets NODE to the number of compute nodes requested by the job waiting for execution indicated by JOB, sets ELAPSE to the time period of usage requested by this job waiting for execution, and sets etime to the value of ELAPSE (step 1401). The search unit 902 compares etime with bf_end (step 1402).

If etime is less than or equal to bf_end (step 1402, NO), the search unit 902 checks whether there are free computational resources of "NODE×ELAPSE" where the head position of the computational resource allocation table 915 is the execution start time point (step 1403). The head position of the computational resource allocation table 915 corresponds to the current time point 0.

If there are free computational resources of "NODE× ELAPSE" (step 1403, YES), the search unit 902 allocates computational resources from the head position (step 1404). Thereby, a result of allocation of the free computational resources to the job waiting for execution indicated by JOB is recorded in the computational resource allocation table 915. After that, the search unit 902 performs step 1207 and the subsequent steps in FIG. 12.

If etime is greater than bf_end (step 1402, YES) or if there are not free computational resources of "NODE×ELAPSE" (step 1403, NO), the search unit 902 performs step 1207 and the subsequent steps in FIG. 12, In this case, the search unit 902 records a job waiting for execution indicted by JOB, as the job incapable of receiving allocation of computational resources, in the computational resource allocation table 915.

According to the first search process in FIG. 14, the execution start time point of the computational resources allocated by backfilling is limited to the current time point 0, which is the head position of the computational resource allocation table 915. Accordingly, the execution start time of a job waiting for execution will not be later than the current time point 0, further decreasing the likelihood that a job having a low priority will hinder the start of execution of a job having a high priority.

Figure 15:
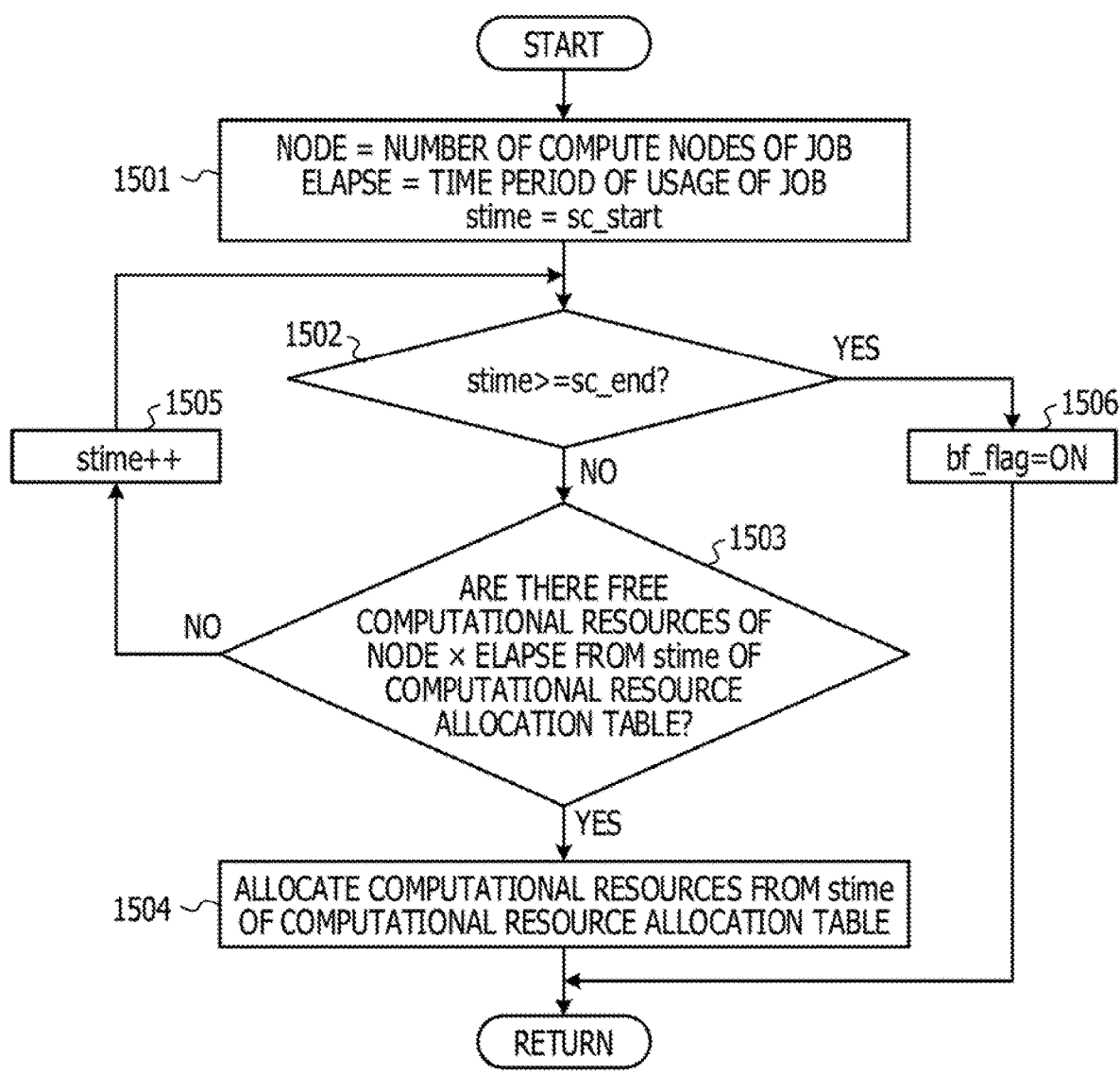
FIG. 15 is a flowchart of a second search process.

FIG. 15 is a flowchart illustrating an example of the second search process in step 1303 in FIG. 13. In the second search process, within the resource search time range T11, free computational resources requested by the job waiting for execution indicated by JOB are searched for.

First, the search unit 902 sets NODE to the number of compute nodes requested by the job waiting for execution indicated by JOB, sets ELAPSE to the time period of usage requested by this job waiting for execution, and sets stime to the value of sc_start (step 1501). The search unit 902 compares stime with sc_end (step 1502).

If stime is less than sc_end (step 1502, NO), the search unit 902 checks whether there are free computational resources of "NODE×ELAPSE" where stime of the computational resource allocation table 915 is the execution start time (step 1503).

If there are free computational resources of "NODE× ELAPSE" (step 1503, YES), the search unit 902 allocates computational resources from stime (step 1504). Thereby, a result of allocation of the free computational resources to the job waiting for execution indicated by JOB is recorded in the computational resource allocation table 915. After that, the search unit 902 performs step 1207 and the subsequent steps in FIG. 12.

Otherwise, if there are not free computational resources of "NODE×ELAPSE" (step 1503, NO), the search unit 902 increments stime by a unit time period (step 1505) and repeats step 1502 and the subsequent steps.

If stime is greater than or equal to sc_end (step 1502, YES), the search unit 902 sets bf_flag to ON (step 1506) and performs step 1207 and the subsequent steps in FIG. 12. In this case, the search unit 902 records a job waiting for execution indicted by JOB, as the job incapable of receiving allocation of computational resources, in the computational resource allocation table 915.

In this way, if, within the resource search time range T11, there are not free computational resources to be allocated to the job waiting for execution indicated by JOB, bf_flag is set to ON. Accordingly, bf_flag=ON indicates that a job incapable of receiving allocation of computational resources has occurred, and bf_flag=OFF indicates that a job incapable of receiving allocation of computational resources has not occurred. When a job incapable of receiving allocation of computational resources has occurred, processing of allocating computational resources from any time point within the resource search time range T11 corresponds to backfilling.

Changing bf_flag from OFF to ON enables the first search process in FIG. 14 to be applied to jobs waiting for execution that will be extracted the next time and thereafter to perform backfill scheduling using the backfilling permission time range T12.

For example, in the job information table 911 in FIG. 10, jobD to jobR, which are jobs waiting for execution, are sorted in order of priorities. First, jobD having the highest priority P1 is set as JOB. At this point, bf_flag is OFF and therefore the second search process in FIG. 15 is performed for jobD as the processing target. Since the computational resources requested by jobD are "7×5", free computational resources in which seven consecutive compute nodes are free continuously for 5 hours are searched for from the current time point 0 towards the future within the resource search time range T11.

However, free computational resources of "7×5" that may be backfilled are not found. Therefore, free computational resources of "7×5" where the time point 9, at which all the jobs being executed will end, is the execution start time point are allocated to jobD. In this case, the execution end time point of jobD is the time point 14, which is outside the resource search time range T11. However, bf_flag is OFF and a job incapable of receiving allocation of computational resources has not occurred. Thus, such free computational resources are allowed to be allocated.

Next, the second search process in FIG. 15 is performed for jobE having the priority P2 as the processing target. Since the computational resources requested by jobE are "3×6", free computational resources in which three consecutive compute nodes are free continuously for 6 hours are searched for from the current time point 0 towards the future within the resource search time range T11.

However, free computational resources of "3×6" are not found within the resource search time range T11. Therefore, resource search in a time range after the time point 12 is not performed, and jobE is recorded as a job incapable of receiving allocation of computational resources. Thereby, since the first job incapable of receiving allocation of computational resources has occurred, bf_flag is set to ON.

Next, jobF having the priority P3 is set as JOB. At this point, bf_flag is ON and therefore the first search process in FIG. 14 is performed for jobF as the processing target. However, the time period of usage requested by jobF is 11 hours. Since the length of the backfilling permission time range T12 is 9 hours, etime>bf_end. Accordingly, computational resources are not allocated to jobF, and jobF is recorded as a job incapable of receiving allocation of computational resources.

Next, the first search process in FIG. 14 is performed sequentially for jobs from jobG having the priority P4 to jobJ having the priority P7 as processing targets. However, free computational resources are not found. Therefore, jobG to jobJ are recorded as jobs incapable of receiving allocation of computational resources.

Next, the first search process in FIG. 14 is performed for jobK having a priority P8 as the processing target. Since the computational resources requested by jobK are "1×9", free computational resources in which one compute node is free continuously for 5 hours from the current time point 0 are searched for within the backfilling permission time range T12. Free computational resources of "1×9" where the current time point 0 is the execution start time point are allocated to jobK by backfilling.

Next, the first search process in FIG. 14 is performed sequentially for jobs from jobL having the priority P9 to jobR having the priority P15 as processing targets. If free computational resources are found, the computational resources are allocated by backfilling. Otherwise, if free computational resources are not found, the processing target job is recorded as a job incapable of receiving allocation of computational resources.

Thereby, free computational resources where the current time point 0 is the execution start time point are allocated to jobL, jobP, and jobQ, whereas jobM, jobN, jobO, and jobR are recorded as jobs incapable of receiving allocation of computational resources. Eventually, such computational resource allocation as represented by the computational resource allocation table 915 in FIG. 11 is performed.

In the computational resource allocation table 915 in FIG. 11, at the current time point 0, computational resources are allocated to jobK, jobL, jobP, and jobQ by backfilling, such that execution of the jobs is immediately started. Therefore, the number of compute nodes used by jobs being executed at the current time point 0 is eight, and the operating ratio of the parallel computer system is 100%. Accordingly, the operating ratio improves from the allocation results in FIG. 3 to FIG. 5.

The configurations of the parallel processing apparatus 601 in FIG. 6 and the parallel computer system 801 in FIG. 8 are merely exemplary, and some of the components may be omitted or changed in accordance with the application or conditions of the parallel processing apparatus 601 or the parallel computer system 801.

The configurations of the job management device 612 in FIG. 6 and the job management device 812 in FIG. 8 are merely exemplary, and some of the components may be omitted or changed in accordance with the application or conditions of the parallel processing apparatus 601 or the parallel computer system 801.

The flowcharts in FIG. 7 and FIG. 12 to FIG. 15 are merely exemplary, and a part of the processing may be omitted or changed in accordance with the configuration or conditions of the job management device. For example, if the backfilling permission time range 913 is not used in the job scheduling in FIG. 12, the processing of step 1301 and step 1302 in FIG. 13, the first search process in FIG. 14, and the processing of step 1506 in FIG. 15 may be omitted.

Figure 1:
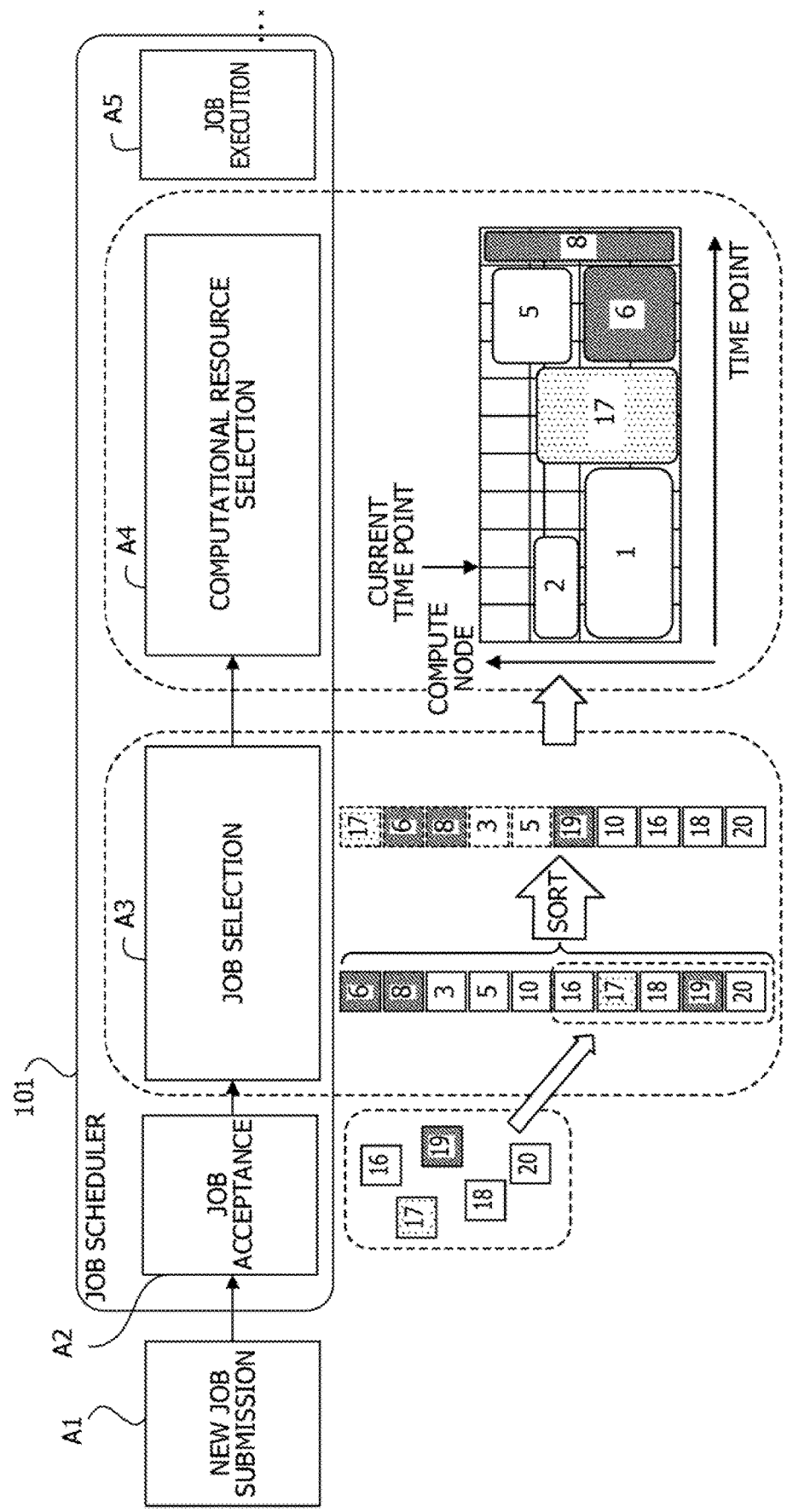
FIG. 1 is a diagram illustrating job scheduling.

The job scheduling illustrated in FIG. 1 may be exemplary, and job scheduling varies in accordance with a submitted job. The computational resource allocation tables illustrated in FIG. 2 to FIG. 5 and FIG. 11 are merely exemplary, and computational resource allocation table varies in accordance with submitted jobs and the algorithm of job scheduling. The job information table illustrated in FIG. 10 may be exemplary, and job information table varies in accordance with submitted jobs.

Figure 16:
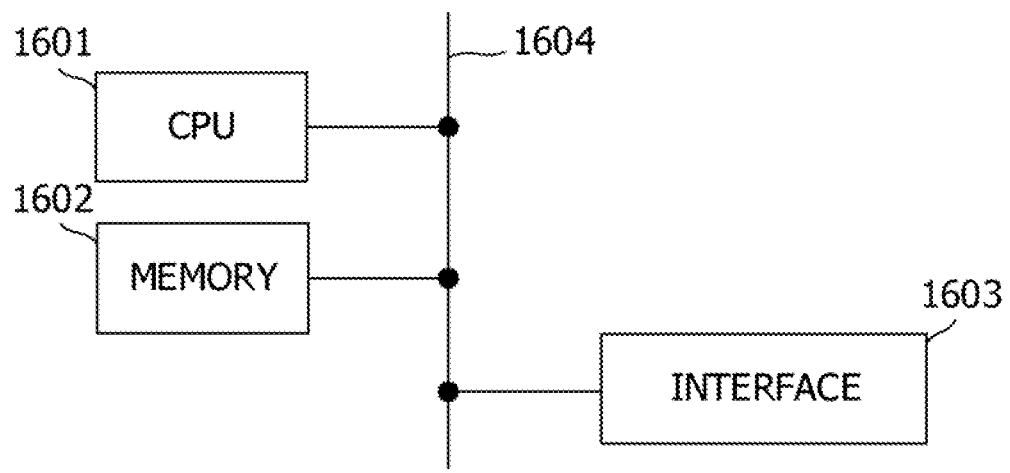
FIG. 16 is a diagram of a configuration of an information processing device used as a compute node.

FIG. 16 illustrates an example of a configuration of an information processing device (computer) used as the compute node 611-*i* in FIG. 6 or the compute node 811-*i* in FIG. 8. The information processing device in FIG. 16 includes a CPU 1601, a memory 1602, and an interface 1603. These components are coupled to each other by a bus 1604.

The memory 1602 is, for example, a semiconductor memory such as a read-only memory (ROM) or a random-access memory (RAM) and stores programs of submitted jobs and data used for execution of the jobs. The CPU 1601 (processor) executes a job by executing a program by utilizing the memory 1602. The information processing device may include a plurality of CPUs.

The interface 1603 is a communication interface circuit that is coupled to the parallel processing apparatus 601 or a network within the parallel computer system 801 and communicates with other compute nodes.

Figure 17:
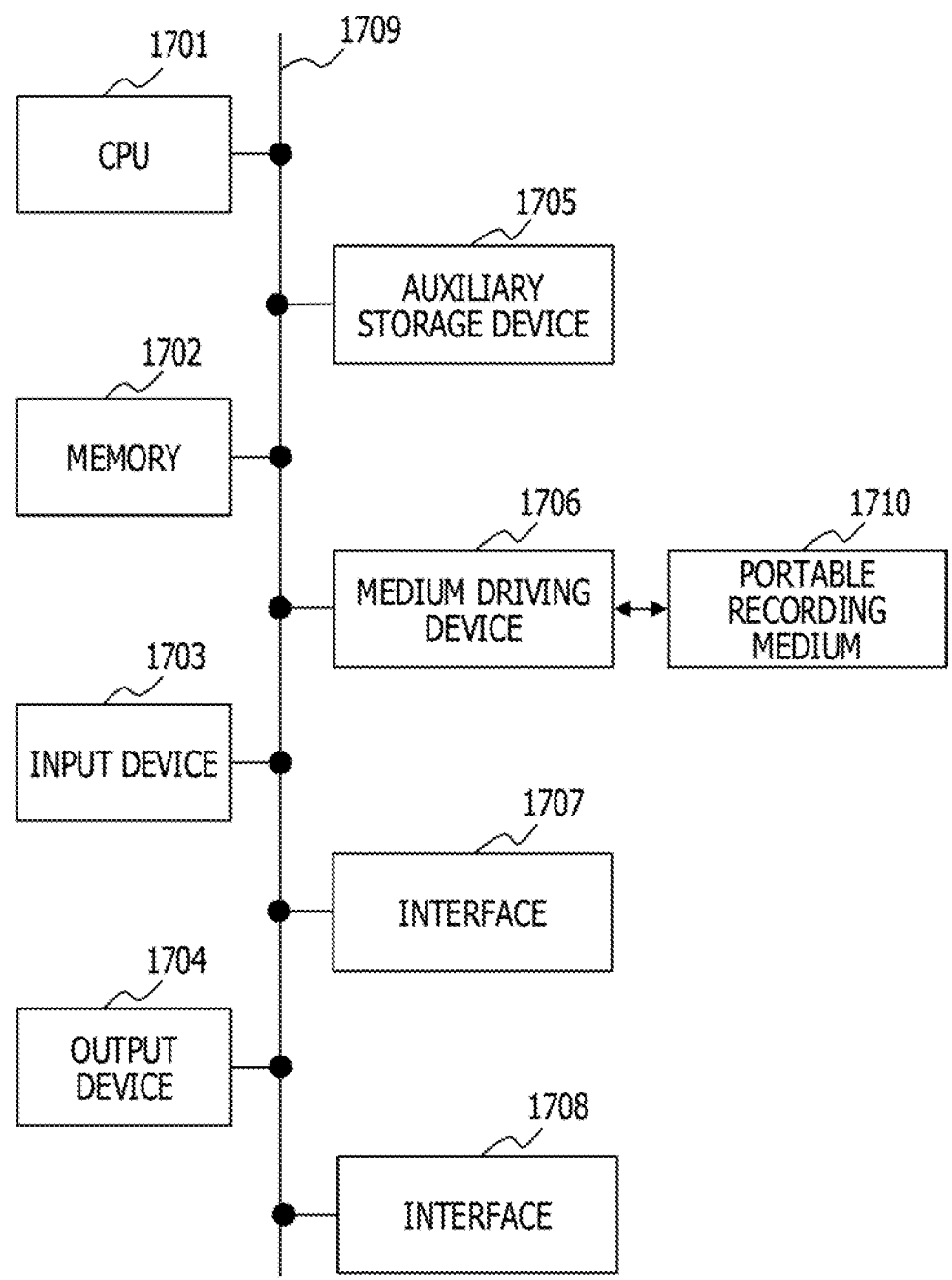
FIG. 17 is a diagram of a configuration of an information processing device used as a job management device.

FIG. 17 illustrates an example of a configuration of an information processing device (computer) used as the job management device 612 in FIG. 6 and the job management device 812 in FIG. 8. The information processing device in FIG. 17 includes a CPU 1701, a memory 1702, an input device 1703, an output device 1704, an auxiliary storage device 1705, a medium driving device 1706, an interface 1707, and an interface 1708. These components are coupled to each other by a bus 1709.

The memory 1702 is, for example, a semiconductor memory such as a ROM or a RAM and stores programs and data used for processing. The memory 1702 may be used as the storage unit 903 in FIG. 9.

The CPU 1701 (processor), for example, operates as the determination unit 621 and the search unit 622 in FIG. 6 by executing a program utilizing the memory 1702. The CPU 1701 also operates as the determination unit 901 and the search unit 902 in FIG. 9 by executing a program utilizing the memory 1702.

The input device 1703 is, for example, a keyboard, a pointing device, or the like and is used to input of an instruction or information from an operator or a user. The output device 1704 is, for example, a display device, a printer, a speaker, or the like and is used for output of inquiries or instructions to the operator or the user and for output of a processing result. The processing result may be an allocation result represented by the computational resource allocation table 915 or may be an execution result of a job.

The auxiliary storage device 1705 is, for example, a magnetic disk device, an optical disk device, a magneto-optical disk device, a tape device, or the like. The auxiliary storage device 1705 may be a hard disk drive or a flash memory. The information processing device may store programs and data in the auxiliary storage device 1705 and may load them into the memory 1702 and use them. The auxiliary storage device 1705 may be used as the storage unit 903 in FIG. 9.

The medium driving device 1706 drives a portable recording medium 1710 and accesses the recorded content. The portable recording medium 1710 is a memory device, a flexible disk, an optical disk, a magneto-optical disk, or the like. The portable recording medium 1710 may be a compact disk read-only memory (CD-ROM), a digital versatile disk (DVD), a Universal Serial Bus (USB) memory, or the like. An operator or a user may cause the portable recording medium 1710 to store programs and data and may load them into the memory 1702 and use them.

In this way, the computer-readable recording medium that stores programs and data used for processing is a physical (non-transitory) recording medium, such as the memory 1702, the auxiliary storage device 1705, or the portable recording medium 1710.

The interface 1707 is a communication interface circuit that is coupled to the parallel processing apparatus 601 or a network within the parallel computer system 801 and communicates with the compute node 611-$i$ or the compute node 811-$i$.

The interface 1708 is a communication interface circuit that is coupled to a communication network such as a local area network (LAN) or a wide area network (WAN) and communicates with an outside device. The information processing device may receive programs and data from an external apparatus via the interface 1708 and may load them into the memory 1702 and use them.

The information processing device may not include all the components illustrated in FIG. 17, and some of the components may be omitted in accordance with art application or conditions. For example, if an interface with a user or an operator is unnecessary, the input device 1703 and the output device 1704 may be omitted. In a case where the portable recording medium 1710 or an outside communication network is not used, the medium driving device 1706 or the interface 1708 may be omitted.

While the disclosed embodiment and its advantages have been described in detail, those skilled in the art may make various changes, additions, and omissions without departing from the scope of the present invention explicitly set forth in the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention

What is claimed is:

1. A parallel processing apparatus comprising:
   a plurality of compute nodes; and
   a job management device that allocates computational resources of the plurality of compute nodes to jobs, the job management device including circuitry configured to:
   calculate a resource search time range based on the largest value from among respective scheduled execution time periods of a plurality of jobs, each of the plurality of jobs being a job existing at a time when the calculating of the resource search time range is performed, each of the plurality of jobs being a job being executed or a job waiting for execution;
   search for, within the calculated resource search time range, first free computational resources from among computational resources of the plurality of compute nodes, to determine whether the first free computational resources is allowed to be allocated to a job waiting for execution that is a processing target among the plurality of jobs;
   in a case where the first free computational resources is allowed to be allocated to the job, allocate the first free computational resources to the job;
   in a case where the first free computational resources is not allowed to be allocated to the job;
   calculate a backfilling permission time range being a time range from the start time point of the resource search time range to a time point at which all of one or more jobs being executed end; and search for, by backfill scheduling within the calculated backfilling permission time range, second free computational resources from among computational resources of the plurality of compute nodes, in order to allocate the second free computational resources to the job waiting for execution that is the processing target.

2. The parallel processing apparatus according to claim 1, wherein the circuitry is configured to calculate the resource search time range by adding a largest value among the respective scheduled execution time periods of the plurality of jobs to a start time point of the resource search time range.

3. The parallel processing apparatus according to claim 1, wherein the job management device further includes a memory configured to store a flag, the flag indicates whether to apply the backfilling permission time range from the start time point of the resource search time range to a time point at which all of one or more jobs being executed end, and the circuitry is configured to search for free computational resources to be allocated to the job waiting for execution that is the processing target, within the resource search time range, when the flag has a value indicating that the backfilling permission time range is not to be applied, and search for free computational resources to be allocated to the job waiting for execution that is the processing target, within the backfilling permission time range, when the flag has a value indicating that the backfilling permission time range is to be applied.

4. The parallel processing apparatus according to claim 3, wherein the circuitry is configured to set the flag to a value indicating that the backfilling permission time range is to be applied, when, within the resource search time range, there are not free computational resources to be allocated to a job waiting for execution that is selected prior to selection of the job waiting for execution that is the processing target.

5. The parallel processing apparatus according to claim 3, wherein the circuitry is configured to allocate, to the job waiting for execution that is the processing target, free computational resources where the start time point of the resource search time range is an execution start time point, within the backfilling permission time range, when the flag has a value indicating that the backfilling permission time range is to be applied.

6. A non-transitory computer-readable storage medium storing a job management program for causing a computer to execute a process, the process comprising:

in allocating computational resources of a plurality of compute nodes to a job, calculating a resource search time range based on the largest value from among respective scheduled execution time periods of a plurality of jobs, each of the plurality of jobs being a job existing at a time when the calculating of the resource search time range is performed, each of the plurality of jobs being a job being executed or a job waiting for execution;

searching for, within the calculated resource search time range, first free computational resources from among computational resources of the plurality of compute nodes, to determine whether the first free computational resources is allowed to be allocated to a job waiting for execution that is a processing target among the plurality of jobs;

in a case where the first free computational resources is allowed to be allocated to the job, allocating the first free computational resources to the job; and in a case where the first free computational resources is not allowed to be allocated to the job;

calculating a backfilling permission time range being a time range from the start time point of the resource search time range to a time point at which all of one or more jobs being executed end; and searching for, by backfill scheduling within the calculated backfilling permission time range, second free computational resources from among computational resources of the plurality of compute nodes, in order to allocate the second free computational resources to the job waiting for execution that is the processing target.

7. The non-transitory computer-readable storage medium according to claim 6, wherein the process further comprises calculating the resource search time range by adding a largest value among the respective scheduled execution time periods of the plurality of jobs to a start time point of the resource search time range.

8. The non-transitory computer-readable storage medium according to claim 6, wherein the process further comprises:

storing a flag indicating whether to apply the backfilling permission time range from the start time point of the resource search time range to a time point at which all of one or more jobs being executed end, searching for free computational resources to be allocated to the job waiting for execution that is the processing target, within the resource search time range, when the flag has a value indicating that the backfilling permission time range is not to be applied, and searching for free computational resources to be allocated to the job waiting for execution that is the processing target, within the backfilling permission time range, when the flag has a value indicating that the backfilling permission time range is to be applied.

9. The non-transitory computer-readable storage medium according to claim 8, wherein the process further comprises setting the flag to a value indicating that the backfilling permission time range is to be applied, when, within the resource search time range, there are not free computational resources to be allocated to a job waiting for execution that is selected prior to selection of the job waiting for execution that is the processing target.

10. The non-transitory computer-readable storage medium according to claim 8, wherein the process further comprises allocating, to the job waiting for execution that is the processing target, free computational resources where the start time point of the resource search time range is an execution start time point, within the backfilling permission time range, when the flag has a value indicating that the backfilling permission time range is to be applied.

11. A job management method executed by a computer, comprising:

by the computer, in allocating computational resources of a plurality of compute nodes to a job, calculating a resource search time range based on the largest value from among respective scheduled execution time periods of a plurality of jobs, each of the plurality of jobs being a job existing at a time when the calculating of the resource search time range is performed, each of the plurality of jobs being a job being executed or a job waiting for execution;

searching for, within the calculated resource search time range, first free computational resources from among computational resources of the plurality of compute nodes, to determine whether the first free computational resources is allowed to be allocated to a job waiting for execution that is a processing target among the plurality of jobs;

in a case where the first free computational resources is allowed to be allocated to the job, allocating the first free computational resources to the job; and in a case where the first free computational resources is not allowed to be allocated to the job;

calculating a backfilling permission time range being a time range from the start time point of the resource search time range to a time point at which all of one or more jobs being executed end; and searching for, by backfill scheduling within the calculated backfilling permission time range, second free computational resources from among computational resources of the plurality of compute nodes, in order to allocate the second free computational resources to the job waiting for execution that is the processing target.

12. The job management method according to claim 11, wherein the computer calculates the resource search time range by adding a largest value among the respective scheduled execution time periods of the plurality of jobs to a start time point of the resource search time range.

13. The job management method according to claim 11, wherein the computer stores a flag indicating whether to apply the backfilling permission time range from the start time point of the resource search time range to a time point at which all of one or more jobs being executed end, searches for free computational resources to be allocated to the job waiting for execution that is the processing target, within the resource search time range, when the flag has a value indicating that the backfilling permission time range is not to be applied, and searches for free computational resources to be allocated to the job waiting for execution that is the processing target, within the backfilling permission time range, when the flag has a value indicating that the backfilling permission time range is to be applied.

14. The job management method according to claim 13, wherein the computer sets the flag to a value indicating that the backfilling permission time range is to be applied, when, within the resource search time range, there are not free computational resources to be allocated to a job waiting for execution that is selected prior to selection of the job waiting for execution that is the processing target.

15. The job management method according to claim 13, wherein the computer allocates, to the job waiting for execution that is the processing target, free computational resources where the start time point of the resource search time range is an execution start time point, within the backfilling permission time range, when the flag has a value indicating that the backfilling permission time range is to be applied.

* * * * *